(12) United States Patent
Latorre

(10) Patent No.: US 6,789,492 B2
(45) Date of Patent: Sep. 14, 2004

(54) HULL ATTACHMENT FOR PLACEMENT OF DRAG REDUCING BUBBLES

(76) Inventor: Robert G. Latorre, 420 Old Hammond - Metairie Rd., Unit 306, Metairie, LA (US) 70005

( * ) Notice: Subject to any disclaimer, the term of this patent is extended or adjusted under 35 U.S.C. 154(b) by 0 days.

(21) Appl. No.: 10/377,007

(22) Filed: Feb. 28, 2003

(65) Prior Publication Data

US 2003/0164133 A1 Sep. 4, 2003

Related U.S. Application Data

(60) Provisional application No. 60/361,006, filed on Mar. 1, 2002.

(51) Int. Cl.$^7$ .................................................. B63B 1/34
(52) U.S. Cl. .................................................... 114/67 A
(58) Field of Search ............................ 114/67 A, 67 R, 114/274

(56) References Cited

U.S. PATENT DOCUMENTS

| 4,825,795 | A | * | 5/1989 | Slemmons | .................. 114/140 |
| 2002/0029731 | A1 | * | 3/2002 | Takahashi | ................. 114/67 A |

FOREIGN PATENT DOCUMENTS

JP    4-287788    * 10/1992

OTHER PUBLICATIONS

Philips, Henoch, Latorre, Nuttall "Microbubble Drag Reduction on a Surface Effect Shipmodel".
Presented at the 26th American Towing Tank Conference, Jul. 22–24, 2001.
Web Institute of Technology, N.Y.
Latorre, Billard, Moutant, Roussel "Bubble Capture Tests with a Large Hydrofoil Towing Tank Test".
Presented at the 26th American Towing Tank Conference, Jul. 22–24, 2001.
Webb Institute of Technology, N.Y.

* cited by examiner

*Primary Examiner*—Ed Swinehart
(74) *Attorney, Agent, or Firm*—Juan J. Lizarraga

(57) ABSTRACT

A series of foils with air or gas injection at their tips are arranged in rows that project outward from the forward submerged section of a ship, boat or submerged hull section. The foils are arranged in single or multiple rows with tip height set to provide suitable bubble injection into the boundary layer surrounding the moving hull surface. The foils can be arranged in single or multiple strips along the hull depending on the amount of air/gas injection.

4 Claims, 5 Drawing Sheets

HULL ATTACHMENT FOR PLACEMENT OF DRAG REDUCING BUBBLES

This application claims priority from U.S. provisional application. Serial No. 60,361,006 ("the '006'application") filed Mar. 1, 2002. The '006 application is incorporated herein by reference.

BACKGROUND OF THE INVENTION

1. Field of the Invention

This invention relates to perpendicular foils for gas injection into the water flowing close to the moving hull surface.

2. Prior Art

Gas or air injection for drag reduction is typically accomplished by blowing air from screens or ejector slits mounted in the hull surface. To achieve the desired drag reduction requires using a large volume blower and distribution system.

The drag reduction is characterized by the extent the air fills the boundary layer at the moving hull surface. When the air flow is approximately 0.666 the boundary layer flow the maximum drag reduction is achieved. This results in a large amount of gas for achieving adequate coverage of the underwater surface of boats and ships

SUMMARY OF INVENTION

It is a principal object of this invention to provide floating or submerged hull drag reduction gas injection system using rows of foils set perpendicular to the hull surface with tip gas injection that requires substantially less gas injection than the conventional gas injection system using hull surface screens or ejector slits.

More specifically it is the object to provide rows of foils with tip gas injection by which arranging the foil height corresponding to the local boundary layer thickness will achieve hull drag reduction over a large portion of the hull surface previously economically unattainable with conventional gas injection systems using screens or ejector slits.

Another object is the capability of this system to clean hulls with self-polishing coatings while creating the hull surface drag reduction.

The foregoing objects can be accomplished by utilizing a series of foils with air or gas injection at their tips arranged in rows that project outward from the forward submerged section of a ship or boat hull. Other characteristics of the foils are designated by terms relating to airfoils. Their spans are upright with low to moderate aspect ratio.

DETAILED DESCRIPTION OF THE INVENTION

Figure 1:
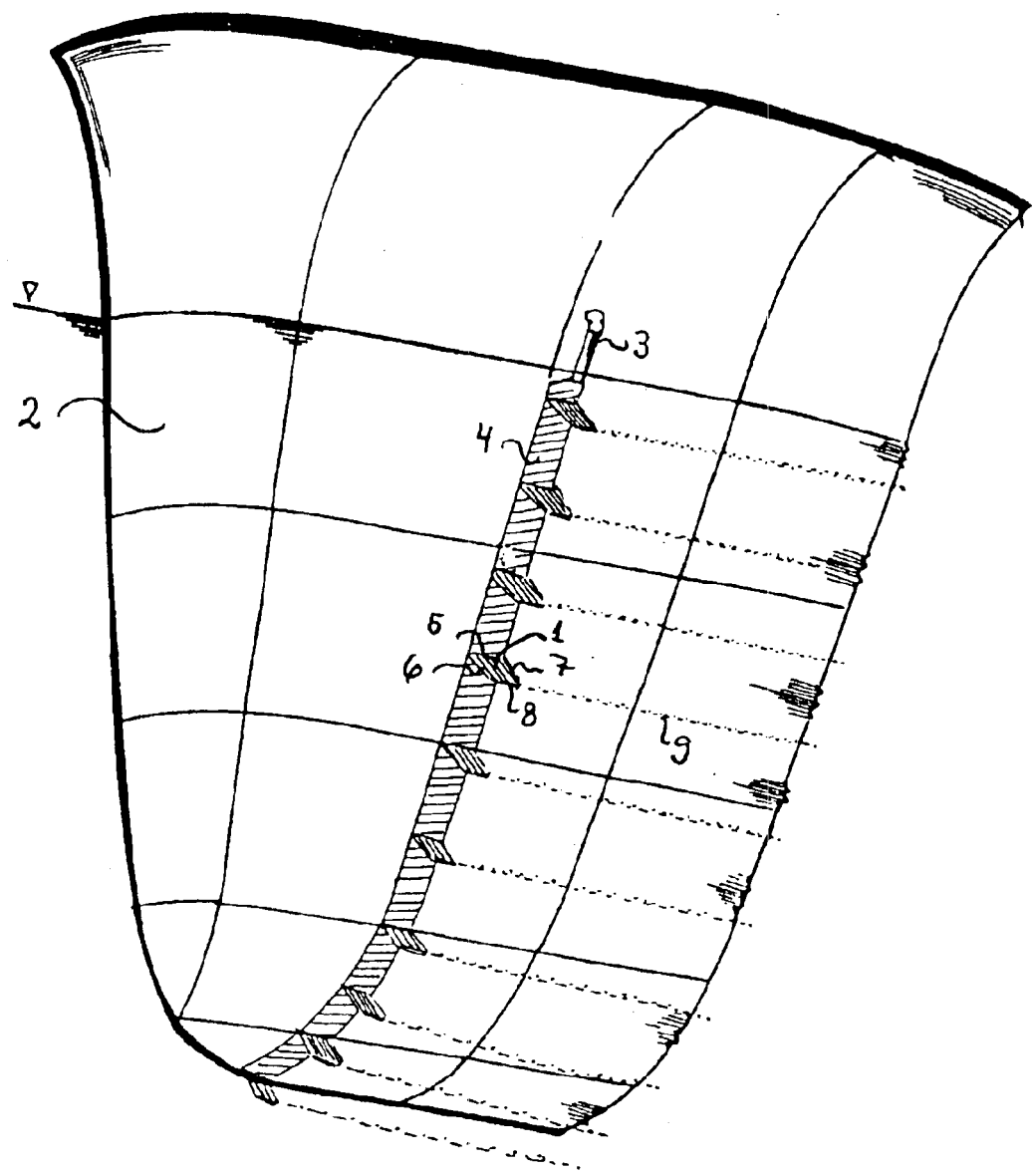
FIG. 1 is a perspective of the forward section of the hull showing an arrangement of the foils according to the present invention projecting outward from the hull surface.

The invention is an attachable series of foils arranged in a line extending below the waterline of a floating vessel or around the circumference of a submerged torpedo or submarine. By suitable placement of these series of foils along the hull length the desired surface of the floating or submerged hull can be coated with micro bubbles.

When the vessel is moving, the foils create a tip vortex that entrains induced or naturally occurring gas bubbles and conveys them downstream. By properly selecting the foil height at each hull section, it is possible to introduce the bubbles at the proper height from the hull surface. By proper selection of the foil height, the micro bubbles are introduced into the hull surface boundary layer as a series of vortices with entrained micro bubbles. This will significantly reduce the gas flow required in conventional filling of the hull surface boundary layer with surface screens and ejectors.

This reduced gas requirement enables the attachable series of foils to be fitted to floating and submerged vessels with large underwater surfaces. These include naval as well as commercial ships such as tankers, bulk carriers, container ships as well as towed or pushed barges. The attachable foils can also be fitted to high-speed marine vehicles. These vessels include recreational boats as well as hydrofoil craft, surface effect ships, high-speed mono-hull, catamarans, trimarans, pentamarans, and other vessels.

With the reduced gas flow this system can be developed with base ducting allowing its attachment with minimum hull penetrations. This will allow the foil series to be easily fitted on existing hulls.

A representative foil installations according to the present invention is shown in the drawings. The series of foils is attached to the underwater surface of floating and submerged marine vehicles. The principle of the invention is applicable to vessels of all sizes.

The attachment of the series of foils along the hull starts near or at the bow. The slope of the hull surface along its vertical section and horizontal waterline is not critical since the foil tip vortices will contour along the hull surface as long as the foil height is within the range of 0.1–0.9 of the local hull surface boundary layer. Typically 0.001 to 0.02 hull length. For hulls with relatively flat underwater sections the longitudinal spacing of the foils is done to provide adequate microbubble or polymer flow typically at intervals of 15–25 ft along the hull length.

The series of foils 1 of the present invention are arranged in a strip 4 with a separation of 0.2–2.0 inches between foils 1. When the strip 4 is installed on the hull surface 2, the foils 1 will be perpendicular to the hull surface 2. FIG. 1 shows a section of the strip 4 with ten foils 1. The foils 1 are arranged in a column extending downward from the water surface. Preferably the foils 1 are of substantially the same height, chord and span wise taper.

Figure 5:
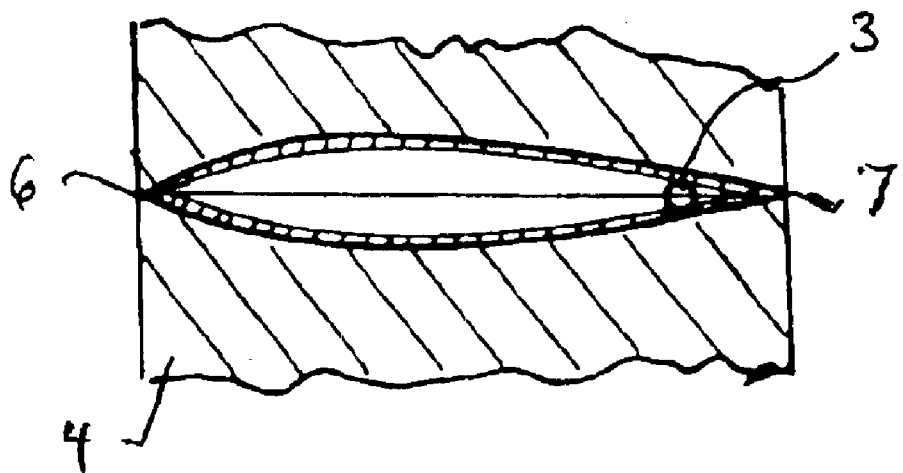
FIG. 5 is a detail section showing the air injection system ducting

Each foil 1 is flat or with an airfoil cross section as shown in FIG. 5. A suitable foil 1 cross-section being thick enough to enclose the gas polymer line 3 from the foil root end 5 to the foil tip 8. Each foil root end 5 is suitably secured to the base strip 4. For ease of manufacture the foil trailing edge 7 preferably is vertical and the leading edge 6 preferably is swept back a moderate amount, from the root end 5 to the foil tip 8. The gas or polymer line 3 outlet can be set in the foil tip 8 or in the trailing edges 7. The base strip 4 can be secured to the hull surface 2 by either welding or adhesive. Generally this near hull region has relatively low water velocity compared to the actual vessel speed.

As shown in FIG. 5, the foil 1 can be set at either zero or a small angle of attack measured from foil leading edge 6 to foil trailing edge 7. The inventor's experiments indicate the bubble entrainment 9 increases with larger foil angle of incidence.

Figure 2:
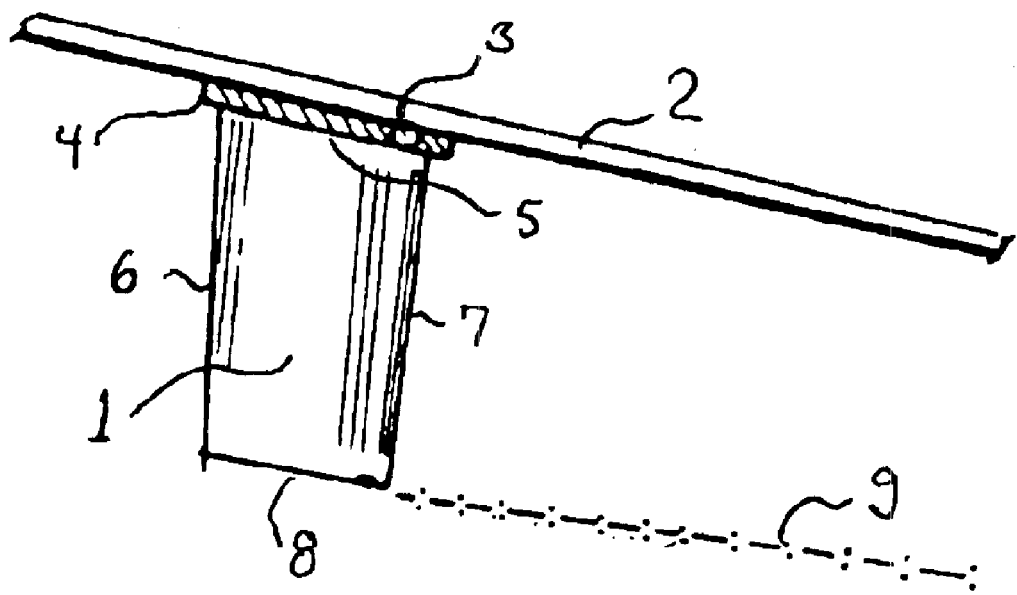
FIG. 2 is a side elevation
Figure 3:
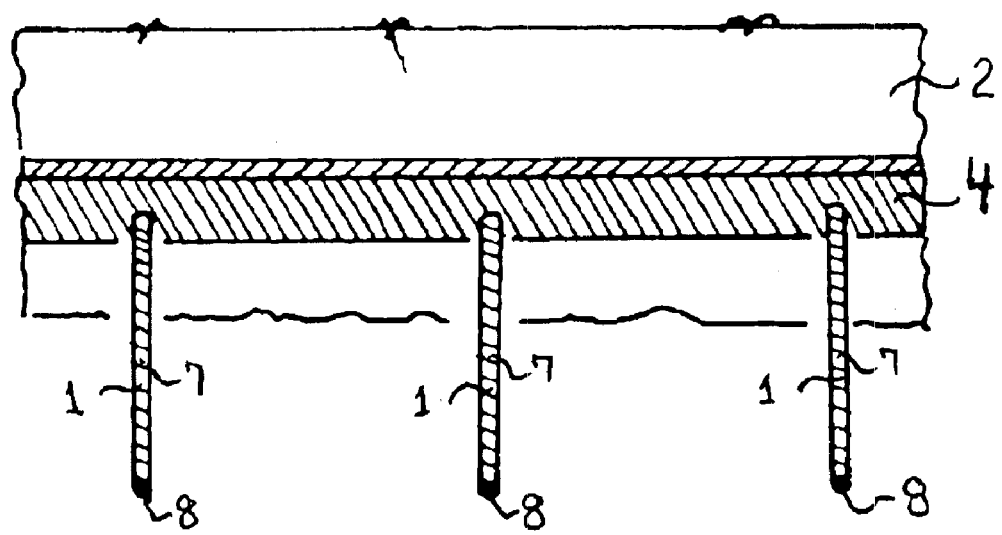
FIG. 3 is a rear elevation
Figure 4:
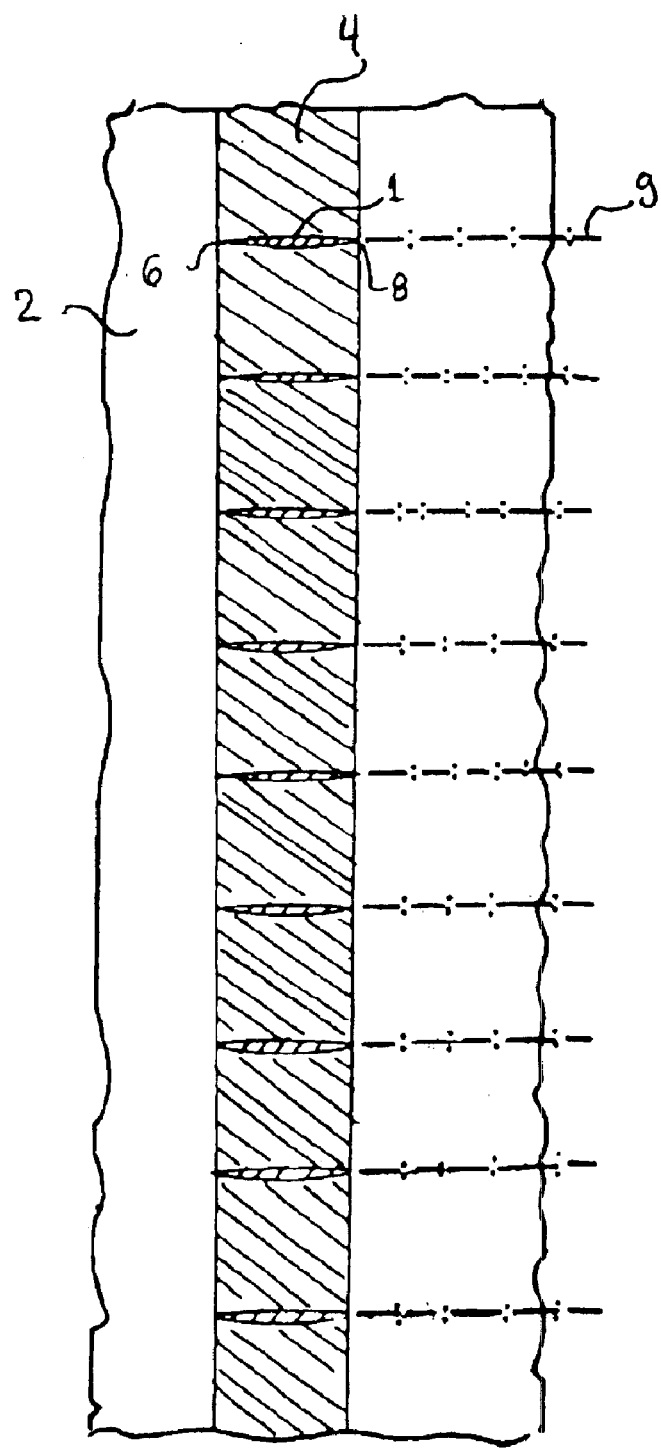
FIG. 4 is a bottom plan of the foils.

Each foil 1 element is of moderate or high aspect ratio, as shown in FIG. 2. The aspect ratio should be within the range and including 1 to 1 and 8 to 1. The aspect ratio of the foil 1 shown in FIG. 2 is approximately 2.5 to 1.

The average chord of each foil 1 element is selected to provide adequate strength and support of the series of foils. The individual cantilever foils 1 shown in FIGS. 1 to 4 inclusive are somewhat vulnerable to bottom grounding. The foil tips 8 can be protected by a shroud forming a gap with the foil tip 8. The foils 1 can retract into the hull slots to avoid damage during shallow water maneuvering.

The required gas flow or polymer for hull drag reduction is sensitive to the speed of the marine vehicle. The gas or polymer flow into the series of foils 1 can be controlled to match the marine vehicle speed. In this manner the drag reduction can be maximized for the minimum gas flow. The gas or polymer flow will also provide a means for disturbing the formation of marine growth on the hull surface.

I claim:

1. A device to reduce the skin friction drag on floating and submerged marine vehicles each having a hull surface with a hull surface boundary layer adjacent to the hull surface while operating at different speeds in water, comprising at least one series of foils each foil having a leading edge, a trailing edge, and a tip, said foils attached to the hull surface extending outward from the hull surface into the water at a distance less than the thickness of the hull surface boundary layer at that position on the hull surface, the foils being attached such that each foil creates a trailing tip vortex with drag reducing microbubble or polymer entrainment within the hull surface boundary layer when the vehicle is underway.

2. A device according to claim 1 further comprising means for controlled injection of drag reducing gas or polymers into the hull surface boundary layer through the tip of the foil at the trailing edge of the foil to march the speed of the vessel.

3. A method for reducing the skin friction drag on floating and submerged marine vehicles each having a hull surface with a hull surface boundary layer adjacent to the hull surface while operating at different speeds in water, comprising the step of attaching at least one series of foils each foil having a leading edge, a trailing edge, and a tip, to the hull surface extending outward from the hull surface into the water at a distance less than the thickness of the hull surface boundary layer at that position on the hull surface, the foils being attached such that each foil creates a trailing tip vortex with drag reducing microbubble or polymer entrainment within the hull surface boundary layer when the vehicle is underway.

4. A method according to claim 3 further comprising the step of controlled injection of drag reducing gas or polymers into the hull surface boundary layer through the tip of the foil at the trailing edge of the foil to match the speed of the vessel.

* * * * *